(12) United States Patent
Maurer (10) Patent No.: US 12,351,247 B1
(45) Date of Patent: Jul. 8, 2025

(54) SPARE TIRE STORAGE ASSEMBLY (71) Applicant: Gary K. Maurer, Midlothian, VA (US)

(72) Inventor: Gary K. Maurer, Midlothian, VA (US)

(*) Notice: Subject to any disclaimer, the term of this patent is extended or adjusted under 35 U.S.C. 154(b) by 40 days.

(21) Appl. No.: 18/108,082

(22) Filed: Feb. 10, 2023

Related U.S. Application Data (60) Provisional application No. 63/308,563, filed on Feb. 10, 2022.

(51) Int. Cl.
*B62D 43/10* (2006.01)

(52) U.S. Cl.
CPC .................. *B62D 43/10* (2013.01)

(58) Field of Classification Search
CPC .................................................. B62D 43/10
USPC ...................................................... 224/42.12
See application file for complete search history.

(56) References Cited

U.S. PATENT DOCUMENTS

| | | | | |
|---|---|---|---|---|
| 2,034,834 A * | 3/1936 | Robinson, Jr. | ....... | B62D 43/002 414/463 |
| 2,547,083 A | 4/1951 | Lundgren | | |
| 3,369,683 A * | 2/1968 | Richards | ........ | B62D 43/04 414/466 |
| 3,435,971 A * | 4/1969 | Powell | ............ | B62D 43/04 414/463 |
| 3,620,396 A * | 11/1971 | Abfalter | ........... | B62D 43/002 414/466 |
| 3,782,568 A * | 1/1974 | Alexander | ......... | B62D 43/002 414/466 |
| 4,087,032 A * | 5/1978 | Miller | .............. | B62D 43/04 414/466 |
| 4,174,797 A * | 11/1979 | Yasue | .............. | B62D 43/002 254/323 |
| 4,228,936 A * | 10/1980 | Rife | ................ | B60R 11/06 224/538 |
| 4,312,620 A * | 1/1982 | Muschalek, Jr. | ...... | B62D 43/04 414/466 |
| 4,418,852 A * | 12/1983 | Grinwald | ........... | B62D 43/04 414/466 |
| 4,428,513 A * | 1/1984 | Delmastro | .......... | B62D 43/04 414/466 |
| 4,711,382 A * | 12/1987 | Helterbrand | ........ | B62D 43/04 414/466 |
| 4,805,817 A * | 2/1989 | Helterbrand | ........ | B62D 43/04 224/42.21 |
| 4,884,729 A * | 12/1989 | Barkouskie | ......... | B62D 43/04 414/466 |
| 4,948,169 A * | 8/1990 | Amundson | ......... | B62D 43/002 224/538 |
| 4,964,552 A * | 10/1990 | Terwilliger | .......... | B62D 43/04 224/42.28 |
| 5,238,358 A * | 8/1993 | Higgins | ............. | B62D 43/045 414/463 |

(Continued)

*Primary Examiner* — Nathan J Newhouse
*Assistant Examiner* — Lester L Vanterpool
(74) *Attorney, Agent, or Firm* — Hooker & Habib, P.C.

(57) ABSTRACT

A spare tire storage assembly includes a cabinet and a separate drawer that holds a spare tire stored in the assembly. The cabinet is fixed to the bottom of a vehicle. The drawer is partially extracted from the cabinet and is then pivoted downwardly with respect to the fixed cabinet to support the front of the drawer against the ground when removing a spare tire from the drawer. The tire can essentially fill the drawer without causing the bottom of the vehicle interfering with pivotal movement of the drawer.

19 Claims, 10 Drawing Sheets

(56) References Cited

U.S. PATENT DOCUMENTS

| | | | | |
|---|---|---|---|---|
| 5,860,786 A * | 1/1999 | Aubrecht | ............. | B62D 43/002 |
| | | | | 414/463 |
| 5,993,133 A * | 11/1999 | Murray | ................ | B62D 43/045 |
| | | | | 414/919 |
| 6,053,690 A * | 4/2000 | Hanson | .................. | B62D 43/04 |
| | | | | 414/466 |
| 7,410,081 B2 * | 8/2008 | McClure | ................ | B62D 43/10 |
| | | | | 224/403 |
| 7,954,679 B2 * | 6/2011 | Edwards | ................ | B62D 43/10 |
| | | | | 224/403 |
| 8,002,336 B2 * | 8/2011 | Reeb | ......................... | E02F 9/00 |
| | | | | 296/193.07 |
| 8,022,336 B2 * | 9/2011 | Casasso | ................ | F02P 19/023 |
| | | | | 219/262 |
| 8,136,897 B2 * | 3/2012 | Mascari | .................. | E05B 65/52 |
| | | | | 16/342 |
| 8,371,485 B2 * | 2/2013 | Rosenplanter | ....... | B62D 43/002 |
| | | | | 296/37.2 |
| 9,221,401 B1 * | 12/2015 | Birkenstock | ............ | B60R 15/00 |
| 11,034,397 B1 * | 6/2021 | Davis | .................. | B62D 43/045 |

* cited by examiner

SPARE TIRE STORAGE ASSEMBLY

RELATED APPLICATION

This application claims priority to and is a non-provisional of United States provisional patent application 63/308,563 "Spare Tire Storage Assembly" filed Feb. 10, 2022 which priority application is incorporated by reference as if fully set forth herein.

FIELD OF THE DISCLOSURE

The disclosure relates generally to storing a spare tire of a wheeled vehicle such an automobile, truck, recreation vehicle, trailer, or the like.

BACKGROUND OF THE DISCLOSURE

Storing and retrieving a tire mounted on a wheel (the tire and wheel referred to collectively as a "spare tire" or "tire" herein) of a wheeled vehicle to and from a conventional spare tire storage area of the vehicle is often inconvenient.

Lifting the spare tire into and out of a trunk of an automobile, for example, is physically demanding for many persons.

Removing a spare tire from a carrier attached to the outside of the vehicle, such as a spare tire mounted on an external carrier, can also be physically demanding.

Hanson U.S. Pat. No. 6,053,690 discloses a spare tire storage assembly attached beneath a vehicle. The assembly includes a tire tray receivable into a housing having a pair of side walls. The housing is movable between a raised position wherein the housing is against the bottom of the vehicle and a lowered position lowered away from the vehicle.

When the housing is in the lowered position, the tire tray is partially extracted out from the housing by a user and is then pivoted to support the front of the tire tray against the ground. The spare tire is now exposed and can be removed from the pivoted tire tray. The reverse steps are used to store the tire removed from the vehicle.

The tire tray and the tire in the tire tray are at least partially supported by the housing side walls while the user is moving and pivoting the tire tray, making it easier and less physically demanding to change a spare tire.

A disadvantage of the Hanson spare tire storage assembly is that the housing must be lowered away from the vehicle before the user can move and pivot the tire tray. The bottom of the vehicle obstructs and prevents the tire tray from pivoting when the housing is in its raised position.

It would be desirable to provide a spare tire storage assembly that enables a tire tray holding a tire to be removed from the housing and then pivoted while the housing is against the bottom of the vehicle. This eliminates the expense of a retraction mechanism to lower the housing, and enables easier construction and more dependable operation of the spare tire storage assembly.

SUMMARY OF THE DISCLOSURE

A spare tire storage assembly for a wheeled vehicle in accordance with this disclosure includes a housing formed as a cabinet and a drawer inserted into the cabinet that includes a tire tray that holds the tire. The cabinet is fixedly attached to the underside of the vehicle and is stationary with respect to the vehicle. The drawer is received into an exposed open end of the cabinet.

The drawer is movable relative to the cabinet between a retracted, closed position and an extended, opened position. When in the closed position, the drawer is inside the cabinet and closes the open end of the cabinet. A spare tire in the drawer is entirely within the cabinet when the drawer is in its opened position.

A user pivots the drawer downwardly from the drawer's opened positon to support the front of the tire tray against the ground. The drawer pivots about a pivot axis that enables the drawer to pivot without the bottom of the vehicle obstructing pivotal movement of the drawer or obstructing pivotal movement of a tire held in the drawer that is closely spaced from the bottom of the vehicle when the drawer was in the closed position.

In a first embodiment spare tire storage assembly in accordance with this disclosure, the pivot axis is behind the tire tray. Thus the entire tire tray, and the entire tire on the tire tray, moves downwardly away from the vehicle during all the pivotal movement of the drawer.

In a second embodiment spare tire storage assembly in accordance with this disclosure, the pivot axis is at or behind the back of the tire stored on the tire tray. The entire tire on the tire tray and the portion of the tire tray extending forwardly from the pivot axis, moves downwardly away from the vehicle during all the pivotal movement of the drawer. The portion of the tire tray extending rearwardly from the tire tray is configured to have side walls, if present, that do not extend upwardly enough to be obstructed by the vehicle during pivotal movement of the drawer.

A spare tire storage assembly in accordance with this disclosure has a number of advantages. It offers the advantage of a movable and pivotal tire tray without requiring the cabinet that houses the drawer to be spaced away from the bottom of the vehicle when removing the spare tire from the tire tray.

There is no need for a retraction mechanism. Operation of the disclosed spare tire storage assembly is more dependable and the spare tire storage assembly is less expensive.

Other objects, features, and advantages of a spare tire storage assembly in accordance with this disclosure will become apparent as the description proceeds, especially when taken in conjunction with the accompanying drawing sheets illustrating one or more illustrative embodiments.

DETAILED DESCRIPTION

Figure 1:
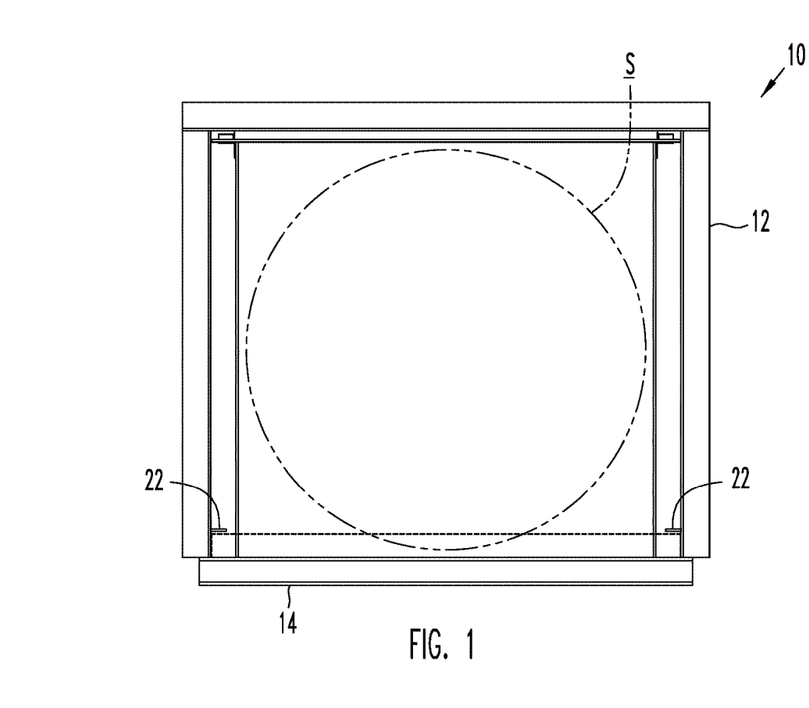
FIGS. 1, 2, and 3 are top, front, and side views respectively of a first embodiment spare tire storage assembly in accordance with this disclosure.
Figure 2:
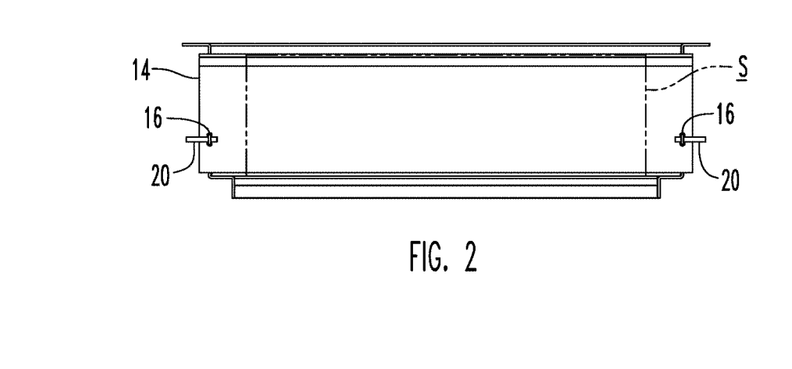
Figure 3:
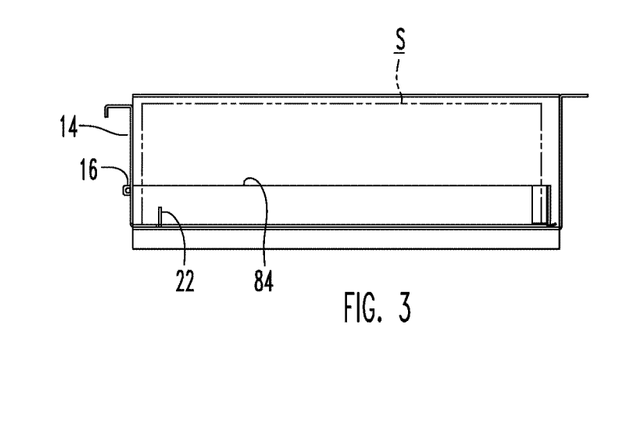

FIGS. 1-3 illustrate a first embodiment of a spare tire storage assembly 10 in accordance with this disclosure. The assembly 10 includes a cabinet 12 and a separate drawer 14 movable with respect to the cabinet 12. The cabinet can be fixedly attached to an underside of a vehicle such as a truck, motor home trailer, or the like that provides sufficient ground clearance for the assembly for safe operation of the vehicle during travel.

FIGS. 1-3 illustrate the drawer 14 inserted into an open front end of the cabinet 12. The drawer is disposed in a closed, retracted position with respect to the cabinet. FIG. 3 is drawn as if the side of the cabinet seen in the view is transparent so as to clearly illustrate components of the drawer inside the cabinet also visible in FIG. 1 through the open top end of the cabinet.

The illustrated drawer 14 includes a tire tray described in more detail below that holds a tire having up to a predetermined maximum tire diameter and up to a predetermined maximum tire width. The illustrated tire tray holds a tire having up to a 30.8 inch outer diameter and up to a 9.3 inch width. FIGS. 1-3 illustrate the drawer holding a 235/80R16 spare tire S shown in phantom lines in FIGS. 1-3 having a diameter of 30.8 inches and a width of 9.3 inches. Drawers for other spare tire storage assemblies in accordance with this disclosure can be designed with tire trays configured to hold tires having a smaller maximum diameter, a larger maximum diameter, a smaller maximum width, or a larger maximum width.

In the closed position of the drawer 14 shown in FIGS. 1-3, the drawer is against the front end of the cabinet 12 whereby the cabinet resists further movement of the drawer into the cabinet. The cabinet includes a pair of lock posts 16 that extend through aligned holes 18 (see FIGS. 9 and 23) in the drawer that receive removable lock pins 20 (shown in simplified form in FIG. 2) that serve to lock the drawer in its closed position during travel.

The cabinet 12 includes a pair of like stop members 22 disposed in the path of the drawer moving away from its closed position to resist inadvertent removal of the entire drawer 14 from the cabinet.

Figure 4:
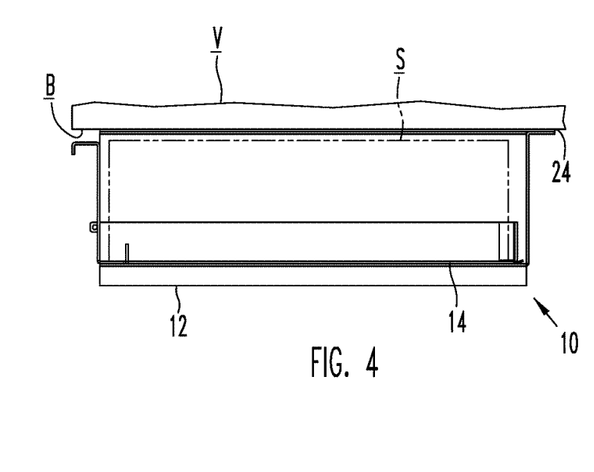
FIG. 4 is similar to FIG. 3 but with the tire storage assembly attached to the bottom of a vehicle.

FIG. 4 is similar to FIG. 3 but illustrates the spare tire storage assembly 10 attached to a bottom surface B of a vehicle V. The upper end of the cabinet 12 is fixedly fastened to the bottom of the vehicle. An optional rigid or elastic upper plate or membrane 24 is shown disposed between the spare tire storage assembly and the bottom of the vehicle that preferably closes and seals the open upper end of the cabinet 12 if required by the construction of the vehicle. The drawer 14 is disposed to be accessible from outside of the vehicle and can be removed from the cabinet for cleaning or repair. In the illustrated embodiment the assembly has about 12 inches of ground clearance when the vehicle is stationary and sitting on level, horizontal ground.

Figure 5:
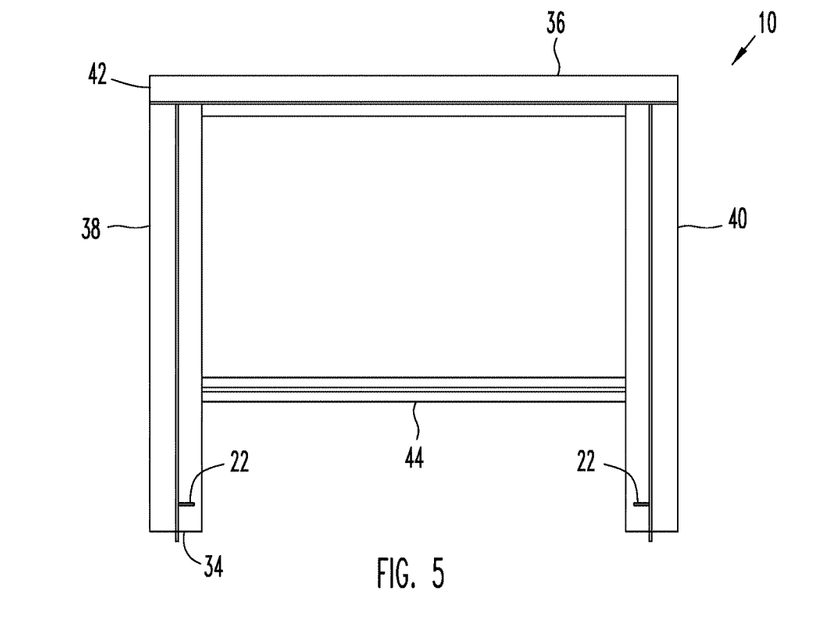
FIGS. 5, 6, and 7 are top, front, and side views respectively of the cabinet of the spare tire storage assembly shown in FIGS. 1-3.
Figure 6:
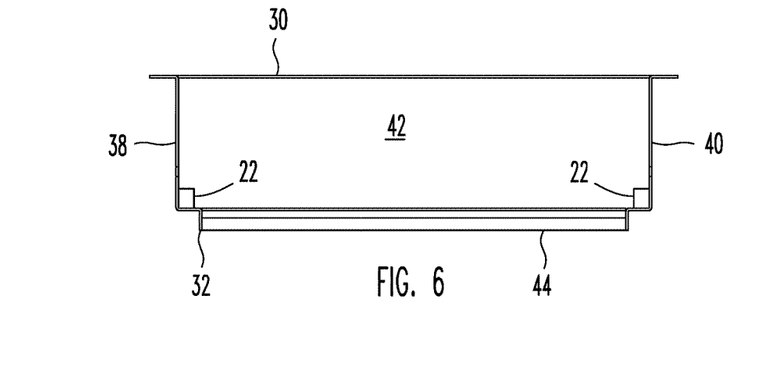
Figure 7:
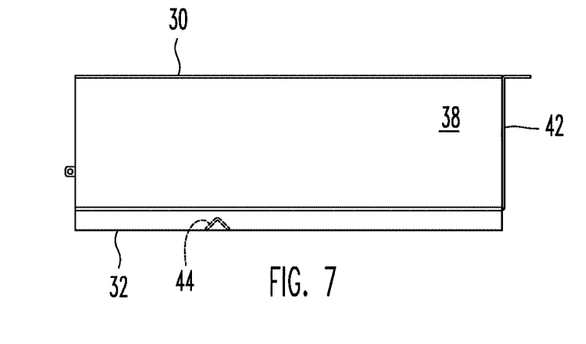

FIGS. 5-7 illustrate the cabinet 12. The cabinet extends in a vertical direction downwardly from an open top side 30 to a spaced-apart bottom side 32, and also extends in a horizontal lateral direction from an open front end 34 to a spaced-apart partially-closed back end 36. The cabinet is shaped as a three-sided box formed from respective spaced apart left and right side walls 38, 40 that extend in a longitudinal direction parallel to one another from the front end of the cabinet to a back wall 42 located on the back end of the cabinet. The ends of an angle or brace 44 (see also FIGS. 15 and 16) are attached to the side walls and cooperate with the back wall 42 to define the spacing between the side walls and to stiffen the three-sided box.

Figure 11:
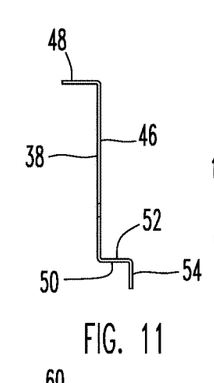
FIGS. 11 and 12 are front and side views respectively of one of the two side walls of the cabinet shown in FIGS. 5, 6, and 7.
Figure 12:
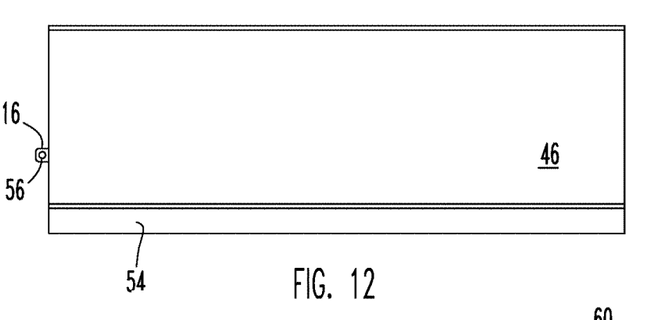

The side walls 38, 40 are mirror images of each other and so only the left side wall 38 shown separately in FIGS. 11 and 12 will be described in detail. The side wall includes a flat vertical wall 46 that extends vertically between an upper horizontal flange 48 disposed on the upper end of the side wall and a lower "L-shaped" flange 50 disposed on the lower end of the side wall. Both flanges run with the vertical wall the entire length of the side wall.

The upper flange 48 is used in attaching the cabinet 12 to the vehicle V using bolts, screws, and the like.

The horizontal leg of the lower flange 50 has a flat, horizontal, upwardly facing bearing surface 52 and a flat, vertical, inwardly facing surface 54. The bearing surface 52 cooperates with the corresponding bearing surface of the right side wall 52 to support the drawer inside the cabinet as will be described in more detail below. The vertical flange surface 54 attaches an end of the angle 44 to the side wall.

Figure 17:
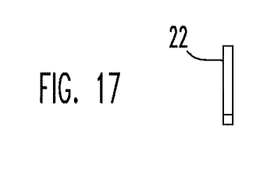
FIGS. 17 and 18 are front and side views respectively of one of the two stop members of the cabinet shown in FIGS. 5, 6, and 7.
Figure 18:
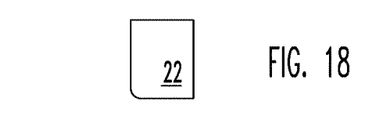

A stop member 22 (see also FIGS. 17 and 18) is fixed to the vertical wall 46 and the bearing surface 52 of the side wall 38. The stop member is spaced inwardly from the front end of the side wall as best seen in FIG. 5. The right side wall 40 also has a stop member attached as described.

The lock posts 16 are formed on the front ends of each of the side rails 38, 40. FIG. 12 illustrates the lock post formed on the front end of the left side wall 38. The lock post 16 extends away from the front of the side wall vertical wall 46. A circular through-hole 56 extends through the lock post to receive the lock pin.

The back wall 42 (see also FIGS. 13 and 14) includes a flat vertical wall 58 extending between a flat horizontal upper flange 60 and a flat horizontal lower flange 62. The upper flange 60 is similar to a cabinet side wall upper flange 48 and extends beyond both ends of the vertical wall 58. The upper flanges of the side walls 38, 40 and the upper flange of the back wall are flush with one another to cooperatively define a continuous upper mounting flange of the cabinet that receives the fasteners attaching the housing 12 to the vehicle V.

Figures 13, 15:
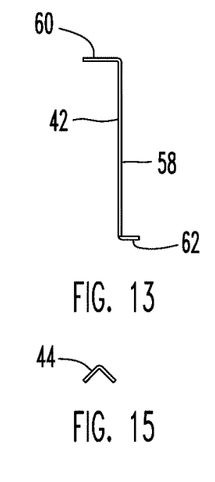
FIGS. 13 and 14 are front and side views respectively of the back wall of the cabinet shown in FIGS. 5, 6, and 7.
FIGS. 15 and 16 are front and side views respectively of the angle brace of the cabinet shown in FIGS. 5, 6, and 7.
Figures 14, 16:
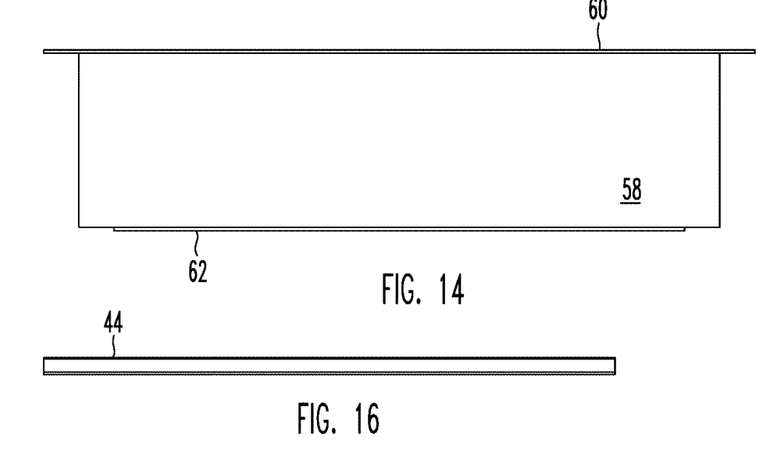

The back wall lower flange 62 ends short of both ends of the vertical wall 58. The back wall lower flange is configured to be closely received between the lower flanges 50 of the side walls 38, 40. The lower flange 62 maintains spacing of the back ends of the side walls 38, 40 and provides added rigidity to the cabinet 12. The lower flange 62 can extend farther towards the front end of the cabinet than in the illustrated embodiment but should not extend far enough to interfere with pivoting of the drawer 14 when removing a spare tire from the assembly 10.

The side walls 38, 40 and the back wall 42 can be formed from flat aluminum plate, cut and folded as necessary to form flanges. The side walls 38, 40, back wall 42, stop members 22, and brace 44 can be welded together to form a rigid, unitary cabinet 12.

Figure 8:
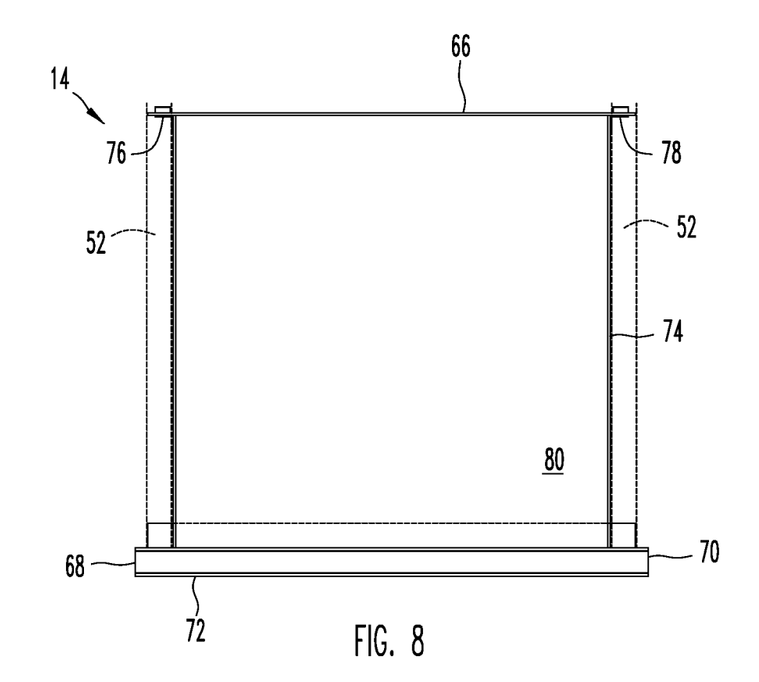
FIGS. 8, 9, and 10 are top, front, and side views respectively of the drawer of the spare tire storage assembly shown in FIGS. 1-3.
Figure 9:
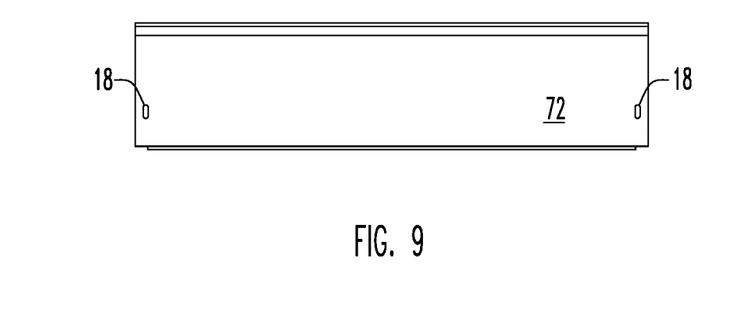
Figure 10:
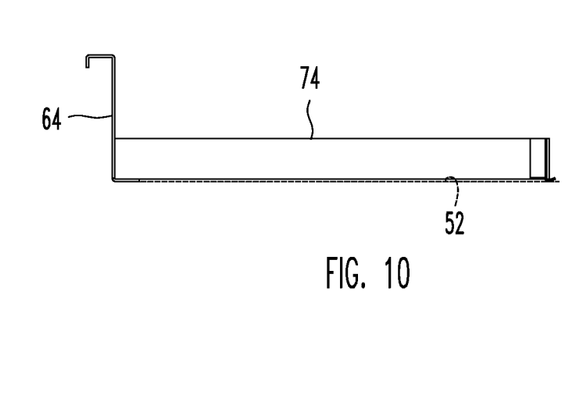

FIGS. 8-10 illustrate the drawer 14. The drawer extends in a longitudinal direction from a front end 64 to a spaced-apart back end 66 and extends in a lateral direction from a left side 68 to a spaced-apart right side 70. The drawer includes a front panel 72 at the front end of the drawer attached to a tire tray 74. A pair of left and right brackets 76, 78 are fixed to the tire tray.

The front panel 72 and the tire tray 74 can each be formed from flat aluminum plate, cut and folded as necessary to form the flanges. The bracket 76, 78 are formed from stainless steel. The front panel, tire tray, and brackets can be welded together to form a rigid, unitary drawer 14.

Figures 19, 20:
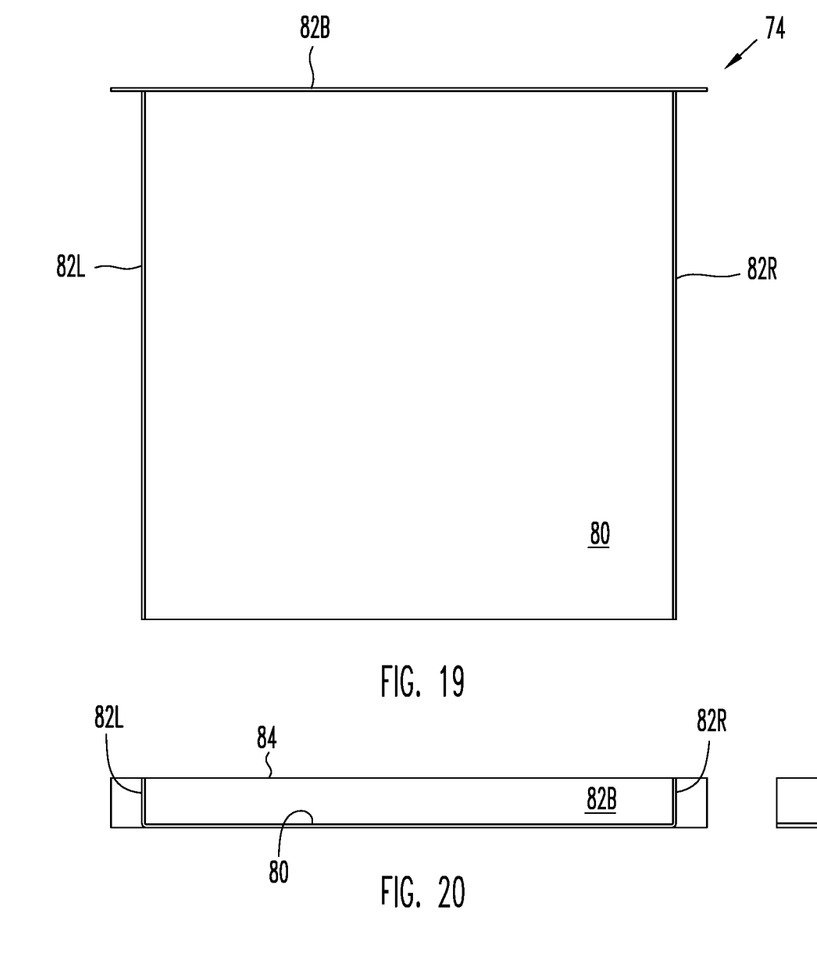
FIGS. 19, 20, and 21 are top, front, and side views respectively of the tire tray of the drawer shown in FIGS. 8, 9, and 10.
Figure 21:
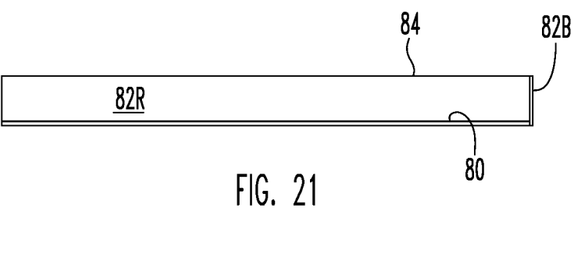

The tire tray 74 is shown in FIGS. 19-21. The tire tray is formed as a three-sided box having a flat floor exposing a square upper tire support surface 80. The tire support surface can support a tire having a maximum diameter equal to the length of each of the sides of the tire support surface. An outer peripheral wall 82 having three sides-left side wall 82L, right side wall 82R, and back side wall 82B extends vertically upwardly from the tire support surface to an open upper end 84 of the tire tray. The back side wall 82B extends beyond both the left and right side walls 82L, 82R to extend over the bearing surfaces 52 of the cabinet side walls 38, 40 when the drawer is fully inserted into the cabinet. The brackets 76, 78 are attached to the left and right extensions respectively of the back side wall.

The upper end 84 of the tire tray is located well short of the upper end of the cabinet 12 when the drawer is inserted into the cabinet as shown in FIG. 3. The side walls extend to about a third of the width of the widest tire that can be placed on the tire tray as can be seen in FIG. 3.

Figure 22:
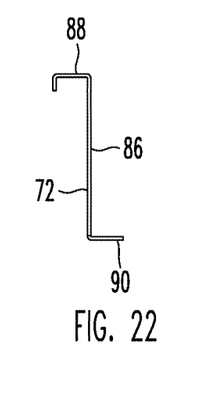
FIGS. 22 and 23 are front and side views respectively of the front panel of the drawer shown in FIGS. 8, 9, and 10.
Figures 23, 24:
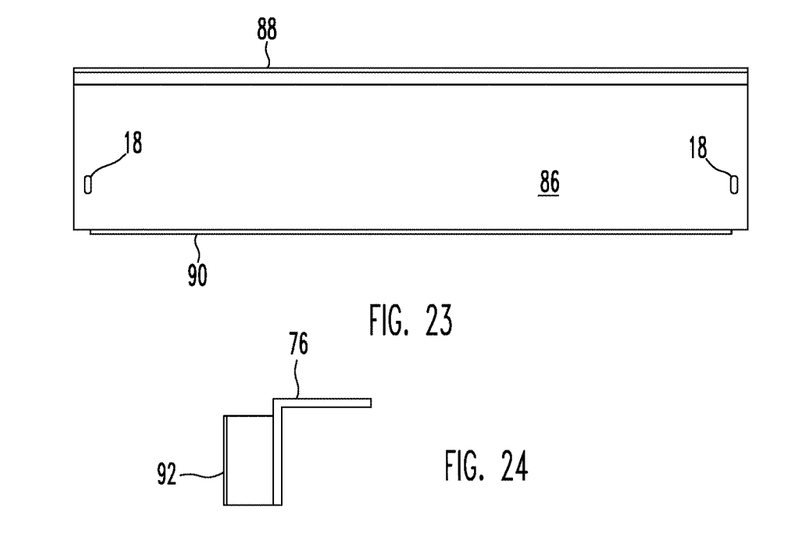
FIGS. 24 and 25 are top and side views respectively of one of the two brackets of the drawer shown in FIGS. 8, 9, and 10.

The front panel 72 is also shown in FIGS. 22 and 23. The front panel includes a flat vertical side wall 86 extending between an upper "L"-shaped flange 88 and a lower flat, horizontal lower flange 90. The spaced apart through-holes 18 are located to receive the lock posts 16 as previously described.

The upper flange 88 extends the full length of the front panel 72. The upper flange is configured to define an exposed drawer handle. The lower flange 90 ends short of both ends of the vertical wall 86 and extends against the bottom of the entire open end of the tire tray 74 to attach the front panel with the tire tray. The lower flange extends beyond both sides of the tire tray to extend over the bearing surfaces 52 of the cabinet side walls 38, 40 when the drawer is fully inserted into the cabinet. The bottom surfaces of the lower flange 90 in contact with the side wall bearing surfaces 52 are drawer bearing surfaces that support the front portion of the drawer against the side wall bearing surfaces 52 when the drawer is fully inserted into the cabinet 12.

The front panel 72 when attached to the tire tray 74 closes the front end of the tire tray and forms a forward peripheral wall of the tire tray. The tire tray peripheral walls closely bound a maximum diameter tire held in the tire tray. The vertical distance of the tire tray tire support surface 80 from the vehicle V defines the maximum width of a tire that can be held in the tire tray as previously described.

Figure 25:
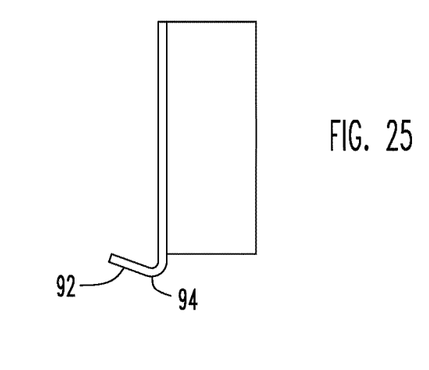

The left and right brackets 76, 78 are stainless steel 90-degree corner brackets connected to the back wall 82B and the outside surfaces of the left wall 82L and right wall 82R respectively. The left and right brackets are mirror images of each other and so only the left bracket 76 will be described in detail (see also FIGS. 24 and 25). The bracket 76 has two equal length legs at right angles to one another. Extending from the bottom of the bracket leg attached to the back wall is a curved member 92 extending about a center of curvature. The curved member is configured to extend beneath the back wall and then away from the back wall. The curved member has a circularly-curved outer surface portion 94.

FIGS. 8 and 10 illustrate in dashed lines the edges of the side wall bearing surfaces 52 that support the drawer 14 in relation to the drawer when the drawer is fully inserted into the cabinet 12. The pair of bottom surface portions of the front panel lower flange 90 in contact with the pair of side wall bearing surface 52 define a front pair of left and right bearing surfaces of the drawer 14 as previously described. The curved outer surface portions 94 of the left and right brackets 76, 78 in line contact with the side wall bearing surfaces 52 define a back pair of left and right bearing surfaces of the drawer 14. The front and back pairs of left and right drawer bearing surfaces are configured to maintain the tire support surface 80 horizontal with respect to the cabinet 12 when the drawer is in its inserted position with respect to the cabinet 12.

Referring back to FIGS. 1-3, the drawer 14 is shown in its inserted position with respect to the cabinet 12, the drawer being fully inserted into the cabinet. The spare tire S is held in the tire tray 74. The tire diameter is closely bounded by the peripheral walls of the tire tray and the tire width is closely bounded by the tire tray tire support surface and the bottom of the vehicle.

The drawer front panel 72 as best seen in FIG. 4 is sized to cover and close the open front end of the cabinet 10 but for a small gap between the top of the front panel handle and the top of the cabinet. The gap is to assure the front panel is not interfered with any vehicle bottom surface irregularities that might impede opening and closing the drawer. The gap can be closed by an elastomer or other waterproof sealing material (not shown) attached to the front panel or cabinet. The front panel, the tire support surface, and the cabinet side walls and back wall essentially enclose the tire and protect the tire while the spare tire is stored in the cabinet.

Figure 26:
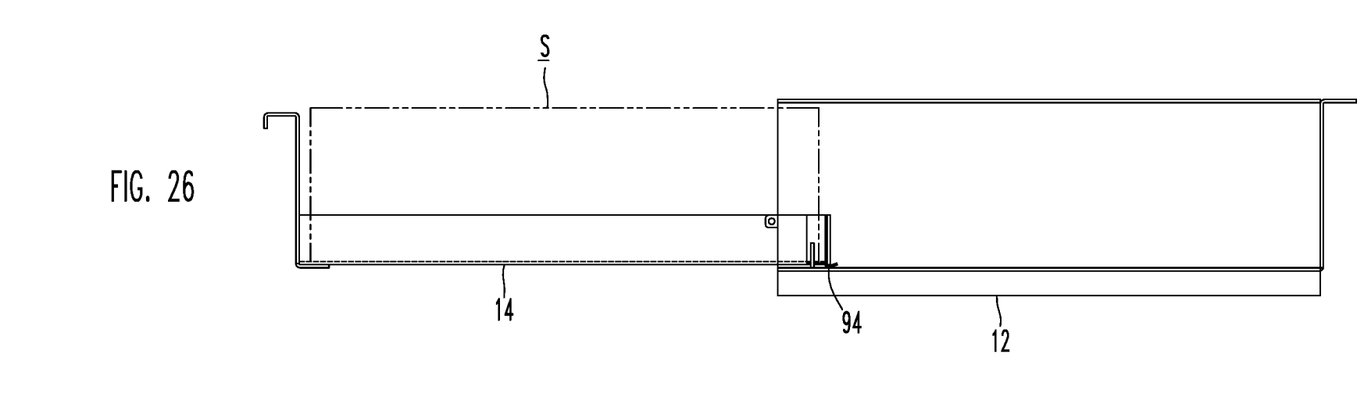
FIG. 26 illustrates the drawer in its extended position extending from the cabinet of the first embodiment spare tire storage assembly.

FIG. 26 illustrates the drawer 14 in its extended position after being pulled out of the cabinet 12 from the drawer's inserted position shown in FIG. 3. A user holds the front panel handle to maintain the tire support surface substantially parallel with the cabinet side wall bearing surfaces 52 while moving the drawer out of the cabinet. The back portion of the drawer is supported by the back pair of bearing surfaces 94 bearing against the cabinet side walls. The drawer brackets are spaced rearwardly a short distance from the cabinet stop members.

Figure 27:
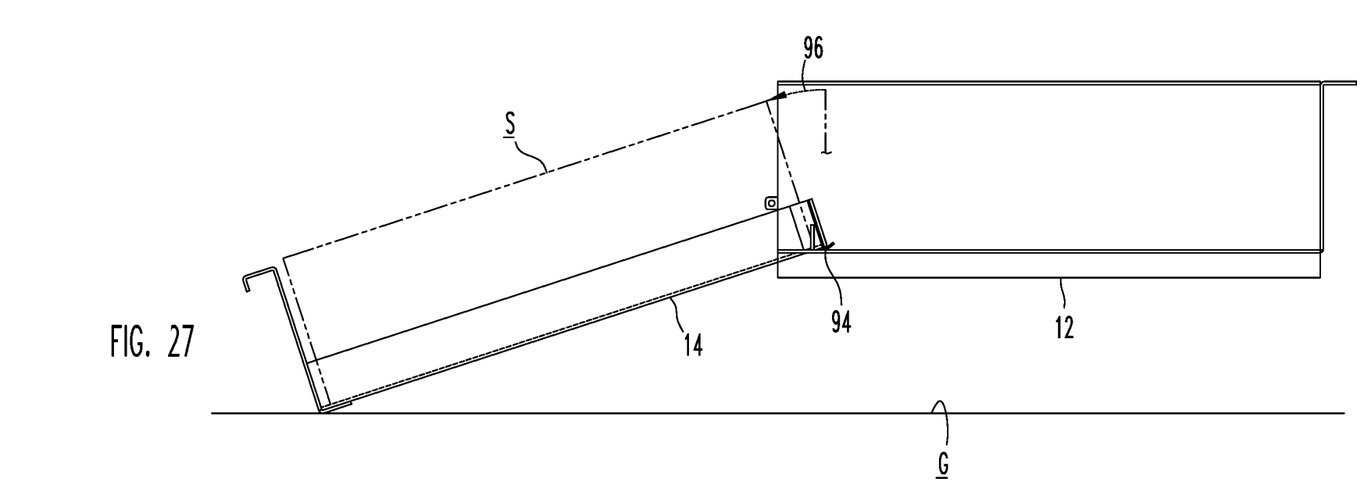
FIG. 27 illustrates the drawer pivoted downwardly from its extended position shown in FIG. 26 and supported against the ground.

FIG. 27 illustrates the drawer being pivoted downwardly from its FIG. 26 horizontal, extended position to support the front of the drawer 14 against the ground G. The transverse spacing between the cabinet side walls 38, 40 provides sufficient clearance for the tire tray 74 and the brackets 76, 78 to be received between the side walls without interference during pivotal movement of the drawer.

The drawer 14 pivots about a pivot axis defined by the centers of curvature of the two curved bracket surfaces 94. The arrowed circular arc 96 illustrates angular displacement of the back of the tire S with pivoting of drawer. Note the top of the tire moves away from the bottom of the vehicle during the entire pivoting displacement of the tire. Thus although the top of the tire starts initially very close to the bottom of the vehicle, the entire tire moves away from the bottom of the vehicle to insure the vehicle does not obstruct pivotal movement of the drawer. The side and back walls of the tire tray are spaced far enough away from the bottom of the vehicle that any reasonable downward pivotal displacement of the drawer to support the drawer front against the ground does not cause the back of the tire tray to strike the bottom of the vehicle. The reduced height of the tire tray walls also makes easier getting a tire into and out of the tire tray once the drawer is supported against the ground.

The flat tire replaced by the spare tire is placed inside the tire tray. The drawer, now holding the flat tire, is pivoted up to its horizontal orientation, and the drawer is then moved back to its closed position to store the flat tire in the spare tire storage assembly 10.

FIGS. 28-31 illustrate two alternative arrangements to support the back of the drawer 14 that replace the curved portions 92 of the left and right drawer brackets 76, 78.

Figure 28:
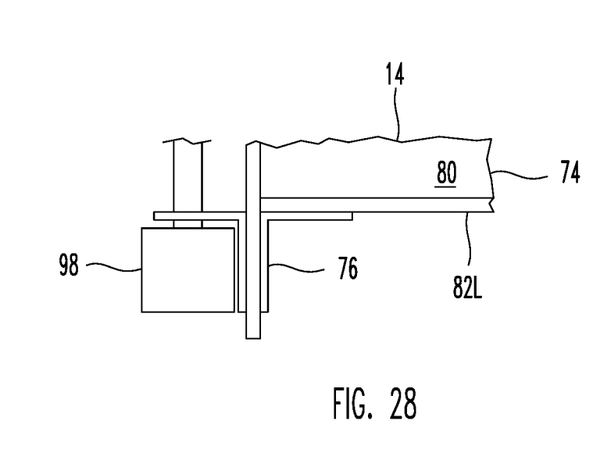
FIGS. 28 and 29 are top and side views respectively of a second embodiment back drawer support having rollers located behind the tire tray that defines a pivot axis of the drawer.
Figure 29:
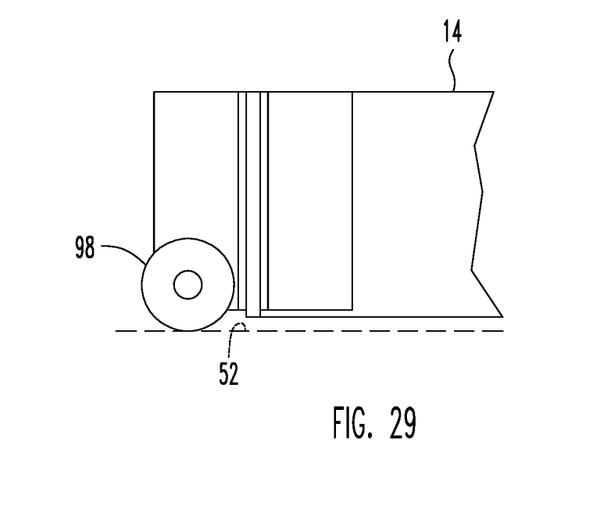

FIGS. 28 and 29 illustrate use of a pair of rear roller 98 (the left side roller only being shown) attached to and located behind the tire tray 74. The rollers are disposed to cooperate with the front panel bearing surfaces to maintain the tire support surface horizontal with respect to the cabinet when the drawer is in its inserted position. The rollers 98 roll on the side wall bearing surfaces 52 during drawer insertion and removal. The rollers make line contact with the side wall bearing surfaces behind the tire tray, and the axis or rotation of the rollers defines the pivot axis of the drawer when pivoting the drawer to and from the drawer's extended position.

Figure 30:
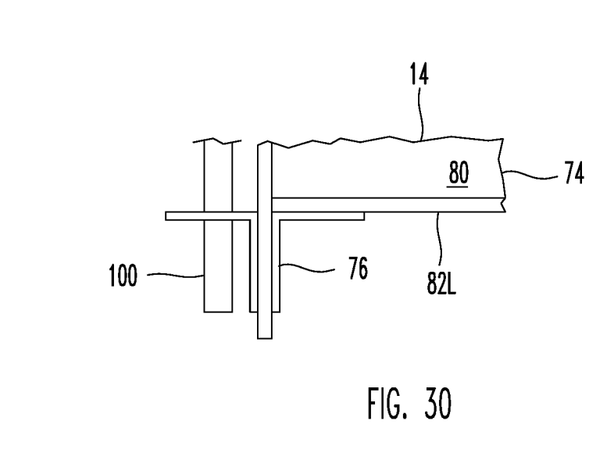
FIGS. 30 and 31 are top and side views respectively of a third embodiment back drawer support having a rod that defines a pivot axis of the drawer.
Figure 31:
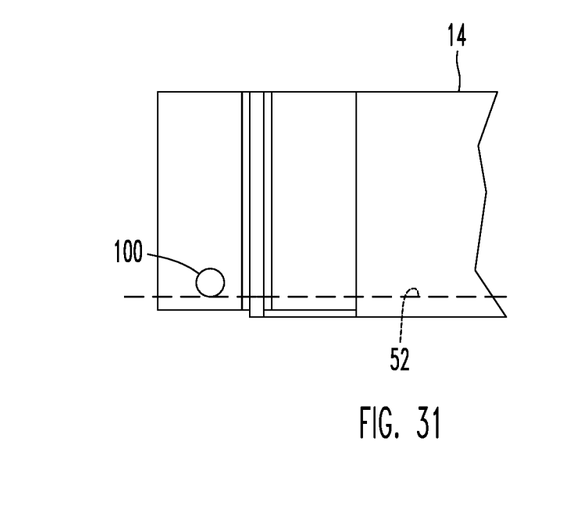
Figure 32:
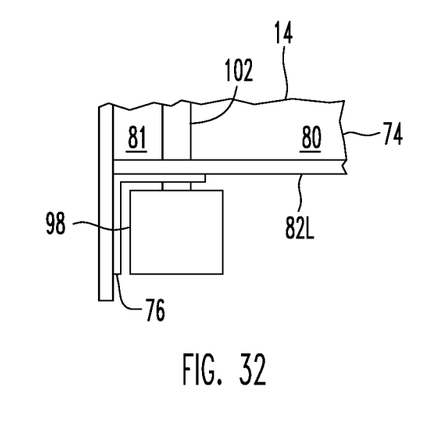
FIGS. 32 and 33 are similar to FIGS. 28 and 29 but the rollers are located to define a pivot axis extending through the tire tray of the drawer.
Figure 33:
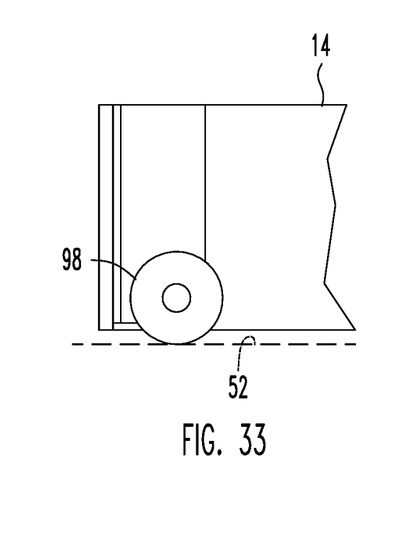
Figure 34:
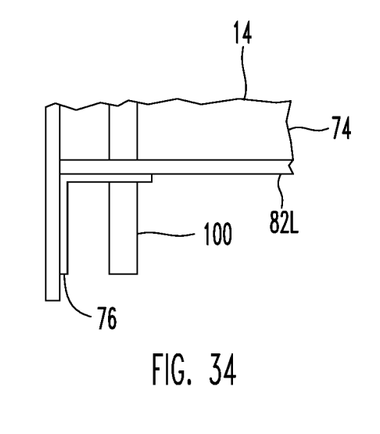
FIGS. 34 and 35 are similar to FIGS. 30 and 31 but with the rod located to define a pivot axis extending through the tire tray of the drawer.
Figure 35:
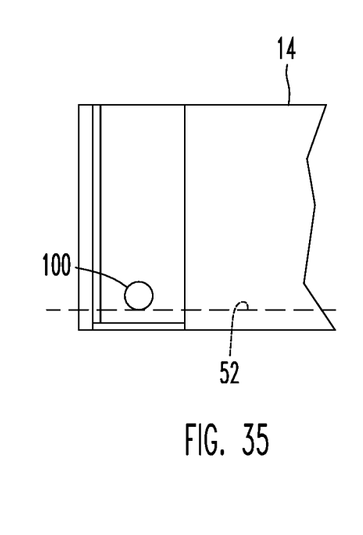

FIGS. 30 and 31 illustrate use of a round rod 100 attached to and located behind the tire tray 74. Opposite ends of the rod slide on the side wall bearing surfaces during drawer insertion and removal (the left end of the rod only being shown). The rod makes line contact with the side wall bearing surfaces behind the tire tray, and the center line of the rod defines the pivot axis of the drawer when pivoting the drawer to and from the drawer's extended position. In this embodiment the bottom of the tire tray is located below the bearing surfaces 52 of the cabinet side walls. The front panel 72 would be modified to conform to the change in tire tray position relative to the cabinet.

FIGS. 32-35 are similar to FIGS. 28-31 but instead mount the rollers 98 or the rod 100 such that the pivot axis of the drawer 14 now extends, when looking down on the tire tray 74. through the tire tray. The tire support surface 80 would extend to the axle rod 102 carrying the rollers 90 or would extend to the rod 100. The adjacent surface portion 81 extending to the back of the tire tray would not be considered a tire support surface because it would not be directly under the tire. By not placing a tire over that portion of the tire tray, it is assured that all of the largest tire supportable on the tire support surface moves downwardly with downward pivoting of the drawer. The distance between the side walls 82R, 82L would be reduced in relation to the distance from the front of the tire tray to the back end of the tire support surface portion if it were desirable to maintain a square tire support surface portion 80.

Figure 36:
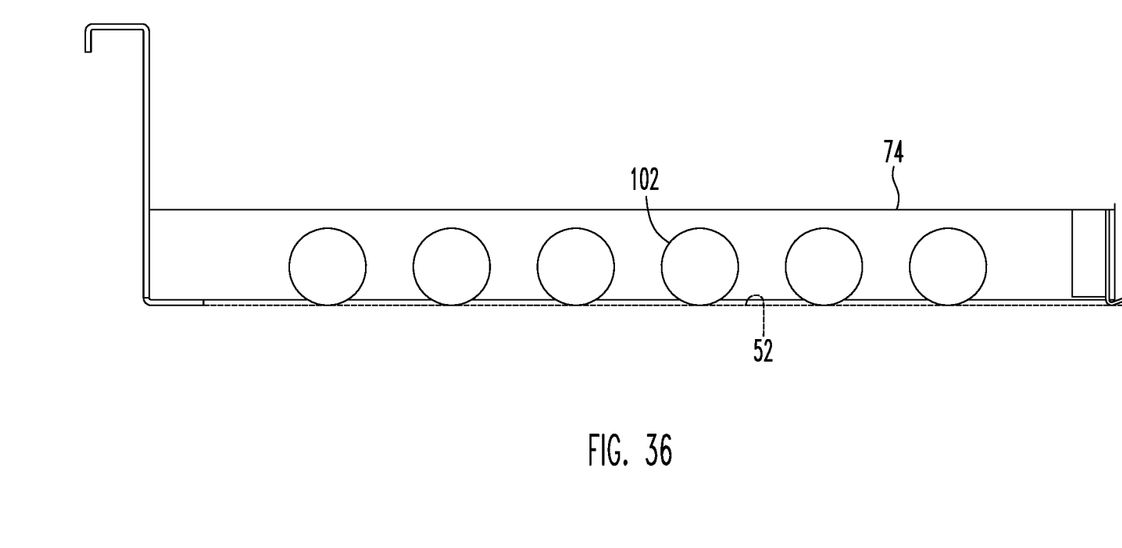
FIG. 36 is a side view of a drawer tray similar to the drawer tray shown in FIG. 10 but with pairs of rollers attached to the tire tray of the drawer.

FIG. 36 illustrates a modification of the drawer 14 to include pairs of rollers 104 attached to and spaced apart the length of the tire tray side walls 82L, 82R. The rollers 104 bear against the cabinet bearing surfaces 52 and assist in supporting the drawer 14 during insertion and extraction of the drawer into and out from the cabinet 12. Because the rollers move with the drawer, the stop members 22 would not be used with use of the rollers 102. The most rearward pair of rollers can be located such that those rollers come out of the cabinet when the drawer reaches its extended position, signaling the user the drawer can now be pivoted downwardly to support the drawer against the ground. In alternative embodiments of the spare tire storage assembly 10, the rollers 100 can be attached to the side cabinet side walls 38, 40 and rotate about axes of rotation fixed with respect to the cabinet 12.

While this disclosure includes one or more illustrative embodiments, it is understood that the one or more embodiments are each capable of modification and that the scope of this disclosure is not limited to the precise details set forth herein but include such modifications that would be obvious to a person of ordinary skill in the relevant art including (but not limited to) changes in material selection, size, environment of use, and the like.

What is claimed is:

1. A spare tire storage assembly for a vehicle, the assembly comprising:

a cabinet and a drawer;

a top side of the cabinet being disposed in a common plane and being configured for fixed attachment to the vehicle, the cabinet extending parallel with a vertical axis of the cabinet downwardly from the top side to a bottom side of the cabinet;

the cabinet comprising an open front end and an opposite rear end, the front and rear ends of the cabinet being spaced apart from each other along a longitudinal axis of the cabinet being perpendicular to the vertical axis of the cabinet;

the drawer being insertable into the open front end of the cabinet to place the drawer into the cabinet, the drawer when inserted into the cabinet being movable with respect to the cabinet in a direction parallel with the longitudinal axis of the cabinet between an inserted position and an opened position, the drawer moving away from the rear end of the cabinet when moving from the inserted position towards the opened position and moving towards the rear end of the cabinet when moving from the opened position towards the inserted position;

the cabinet comprising spaced-apart left and right rigid side walls and a rear wall being disposed on the rear end of the cabinet attached to the left and right side walls, the left and side walls in a fixed relationship with respect to each other, each individual side wall of the left and right side walls extending a length in a direction parallel with the longitudinal axis of the cabinet from the front end of the cabinet towards the rear end of the cabinet, the left and right side walls being spaced apart from one another in a transverse direction perpendicular to the longitudinal axis, each individual side wall of the left and right sidewalls comprising a flat horizontal bearing surface extending longitudinally from the front end of the cabinet, the individual sidewall extending a fixed, predetermined distance vertically from the flat horizontal bearing surface to the top side of the cabinet along the entire length of the individual sidewall;

the drawer comprising a front panel, a tire tray, a left bearing member, and a right bearing member, the front panel being disposed on a front end of the drawer, the drawer extending to an opposite back end of the drawer, the front and back ends of the drawer being spaced apart from one another along a longitudinal axis of the drawer;

the front panel being disposed adjacent to a front end of the tire tray, the front panel being configured to abut against the side walls of the cabinet to define the inserted position of the drawer and to resist further movement of the drawer from the inserted position towards the back end of the cabinet;

the tire tray comprising a floor, a left side wall, a right side wall, and a back member, the floor being attached to the front panel, the floor extending from the front panel from a front side of the floor in a longitudinal direction parallel with the longitudinal axis of the drawer towards an opposite back end of the floor and extending along the front panel in a transverse direction perpendicular to the longitudinal axis of the drawer between opposite left and right sides of the floor;

the floor comprising a flat rectangular tire support surface on an upper side of the floor, the flat rectangular tire support surface having a width and a length, the width spacing apart the left and right sides of the floor and the length spacing apart the front panel and the opposite back end of the flat rectangular tire support surface;

the left side wall of the tire tray extending vertically upwardly from the floor of the tire tray along the left side of the tire support surface, the right side wall of the tire tray extending vertically upwardly from the floor of the tire tray along the right side of the tire support surface, the back member extending along the back end of the tire support surface and having an upper side spaced vertically upwardly from the floor of the tire tray and extending along the back end of the tire support surface wherein the left side wall of the tire tray, the right side wall of the tire tray, and the back member of the tire tray are each spaced away from the upper end of the cabinet when the drawer is inserted into the cabinet;

when the drawer is in the inserted position the tire support surface faces towards the top side of the cabinet and is spaced vertically a distance below the top side of the cabinet, the length of the tire support surface between the front panel and the back member of the tire tray and the width of the tire support surface between the left and right side walls of the tire tray defining a maximum diameter of a tire that can be placed in the drawer entirely on the tire support surface that can be received within both the length and the width of the tire support surface, the vertical distance from the tire support surface to the top side of cabinet defining the maximum tire width that can be placed in the drawer on the tire support surface;

the left bearing member and the right bearing member of the drawer each being connected to the floor and conjointly movable with the floor during movement of the drawer between inserted and opened positions of the drawer, the left bearing member and the right bearing member being configured to cooperatively define a pivot axis extending parallel with the transverse direction of the floor, the pivot axis being parallel with the back side of the tire support surface and being spaced away from the front panel in the longitudinal direction of the drawer at least the same distance as the longitudinal distance of the back side of the tire support surface from the front panel;

when the drawer is in the inserted position, the drawer is supported against the support surfaces of the cabinet with the left bearing member engaged against the left support surface of the cabinet and the right bearing member engaged against the right support surface of the cabinet wherein the said drawer bearing members support the tire tray between the pair of side members of the cabinet with the tire support surface of the tire tray being spaced vertically a minimum first distance from the top end of the cabinet whereby the drawer can hold a tire inside the cabinet on the tire support surface having a maximum diameter and a maximum width;

when the drawer is in the extended position a front end of the drawer extends outwardly from the front end of the cabinet wherein the left and right bearing members of the drawer are engaged against the support surfaces of the right and left side walls of the cabinet; and the drawer when in the extended position being pivotally movable with respect to the cabinet about the pivot axis defined by the left and right bearing members to pivot the front end of the drawer downwardly with respect to the cabinet and between the left and right sidewalls of the cabinet, whereby a tire having the maximum width and maximum diameter on the tire support surface can initially pivot downwardly with the drawer sufficiently to expose the tire for removal from the tire tray without a portion of the tire or the drawer extending beyond the top side of the cabinet.

2. The spare tire storage assembly of claim 1 wherein the back member of the tire tray is a back wall of the tire tray connecting the left and right sides of the tire tray, the back wall of the tire tray extending vertically upwardly from the floor of the tire tray away from the tire support surface along the back side of the tire support surface.

3. The spare tire storage assembly of claim 2 wherein the back wall of the tire tray extends beyond the left and right sides of the tire support surface to define left and right portions of the back wall, the left and right portions of the back wall extending over the bearing surfaces of the left and right side walls respectively of the cabinet when the drawer is in the inserted position, the left bearing member being attached to the left portion of the back wall, and the right bearing member being attached to the right portion of the back wall.

4. The spare tire storage assembly of claim 3 wherein each bearing member of the left and right bearing members comprises a curved surface that extends below the back wall of the drawer to engage the bearing surface of the cabinet side wall engaged by the bearing member.

5. The spare tire storage assembly of claim 4 wherein the curved surface of each bearing member of the left and right bearing members makes line contact with the bearing surface of the cabinet side wall engaged by the bearing member.

6. The spare tire storage assembly of claim 1 wherein the left and right bearing members of the drawer are fixed members with respect to the tire tray.

7. The spare tire storage assembly of claim 1 wherein a respective locking member extends from the front end of each individual left and right side wall of the cabinet that extends through respective through-holes formed in the drawer front panel when the drawer is in the inserted position.

8. The spare tire storage assembly of claim 1 wherein the front panel defines a handle comprising a surface facing and spaced away from the front end of the cabinet when the drawer is in the inserted position.

9. The spare tire storage assembly of claim 1 wherein the front panel of the drawer bears against the support surfaces of the cabinet and cooperates with the left and right bearing members to maintain the tire support surface parallel with the support surfaces of the cabinet when the drawer is in the inserted position.

10. The spare tire storage assembly of claim 1 wherein the cabinet comprises a pair of stop members, each stop member being disposed in the path of movement of the drawer moving from the inserted position to the open position to define the opened position of the drawer.

11. The spare tire storage assembly of claim 1 wherein, when the drawer is in the inserted position, the left and right side walls of the tire tray and the back member of the tire tray each have an upper side vertically spaced way from the tire support surface about one-third the vertical distance the tire support surface is spaced from the upper end of the cabinet.

12. The spare tire storage assembly of claim 1 wherein the cabinet comprises a rear wall disposed at the rear end of the cabinet, the rear wall extending between and connected to the left and right side walls of the cabinet.

13. The spare tire storage assembly of claim 1 wherein each individual bearing member of the left and right bearing members of the drawer is a roller being rotatable about the pivot axis.

14. The spare tire storage assembly of claim 13 wherein the drawer comprises:
- a plurality of second rollers rotatably connected to the left side of the tire tray and being spaced apart from one another between the roller of the left bearing member and the front panel;
- a plurality of third rollers rotably connected to the right side of the tire tray and being spaced apart from one another between the roller of the right bearing member and the front panel;
- wherein the plurality of first rollers and the plurality of second rollers each assist in supporting the drawer against the support surfaces of the cabinet when the drawer is in the inserted position.

15. The spare tire storage assembly of claim 1 wherein the back member of the tire tray is a rod supported over the floor of the tire tray by the left and right side walls of the tire tray.

16. The spare tire assembly of claim 15 wherein the rod extends over and engages the left and right bearing surfaces of the cabinet to form the left and right bearing members of the drawer.

17. The spare tire assembly of claim 1 wherein the rod has end portions that extend over the left and right bearing surfaces of the cabinet, and rollers attached to the end portions of the rod form the left and right bearing members of the drawer.

18. A vehicle comprising the spare tire storage assembly of claim 1, the top side of the cabinet being fixedly attached against the vehicle whereby the vehicle closes the top side of the cabinet.

19. The vehicle of claim 18 wherein the drawer of the spare tire storage assembly is accessible from outside of the vehicle.

* * * * *